(12) United States Patent
Zhang et al.

(10) Patent No.: US 7,315,844 B2
(45) Date of Patent: Jan. 1, 2008

(54) SYSTEM, METHOD AND PROGRAM TO ESTIMATE COST OF A PRODUCT AND/OR SERVICE

(75) Inventors: Yue Zhang, Boulder, CO (US); Weiping Zhao, Superior, CO (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 10/961,638

(22) Filed: Oct. 8, 2004

(65) Prior Publication Data

US 2006/0080264 A1 Apr. 13, 2006

(51) Int. Cl.
*G06Q 99/00* (2006.01)

(52) U.S. Cl. .............................. 705/400; 705/1; 705/26

(58) Field of Classification Search ................ 705/400, 705/1, 26
See application file for complete search history.

(56) References Cited

U.S. PATENT DOCUMENTS

| 6,016,485 | A | 1/2000 | Amakawa et al. ........... 705/400 |
| 6,175,957 | B1 | 1/2001 | Ju et al. ........................ 717/9 |
| 6,330,552 | B1 | 12/2001 | Farrar et al. ................. 705/400 |
| 2001/0027447 | A1 | 10/2001 | Matsuura .................... 705/400 |
| 2002/0087490 | A1 | 7/2002 | Ueda et al. .................. 705/400 |
| 2003/0130901 | A1* | 7/2003 | Archibald et al. ............. 705/26 |

(Continued)

FOREIGN PATENT DOCUMENTS

JP 2001155018 A2 6/2001

WO WO 2005060513 A2 * 7/2005

OTHER PUBLICATIONS

Hanson et al., "Optimal Bundle Pricing", Feb. 1990, Management science, vol. 36, No. 2, pp. 155-174.*

*Primary Examiner*—Igor N. Borissov
*Assistant Examiner*—Freda A. Nelson
(74) *Attorney, Agent, or Firm*—Duke W. Yee; Arthur J. Samodovitz; Gerald H. Glanzman

(57) ABSTRACT

System, method and computer program product for estimating the cost of a product and/or service. The product and/or service comprises a multiplicity of components. One or more first components with no cost dependencies are determined and assigned to a first tier. One or more second components whose costs depend on the costs of the one or more first components are determined and assigned to a second tier. One or more third components whose costs depend on the one or more second components are determined and assigned to a third tier. A determination is made if any of the one or more third components were assigned to said second tier, and if so, such one or more third components are removed from the second tier. One or more fourth components whose costs depend on the one or more third components are determined and assigned to a fourth tier. A determination is made if any of the one or more fourth components were assigned to the third tier, and if so, such one or more fourth components are removed from the third tier. A determination is made if one or more of the fourth components were assigned to said second tier, and if so, such one or more fourth components are removed from the second tier. An order to calculate costs of the components is based on the tier to which they are assigned, the lower the tier the earlier in the order.

1 Claim, 8 Drawing Sheets

U.S. PATENT DOCUMENTS

| | | | |
|---|---|---|---|
| 2004/0032422 A1 | 2/2004 | Fisher et al. | 345/716 |
| 2004/0162798 A1* | 8/2004 | Satou et al. | 705/400 |
| 2004/0267674 A1* | 12/2004 | Feng et al. | 705/400 |
| 2004/0267676 A1* | 12/2004 | Feng et al. | 705/400 |
| 2005/0256778 A1* | 11/2005 | Boyd et al. | 705/26 |

* cited by examiner

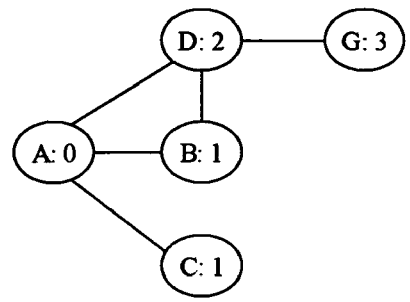
FIGURE 4(D)
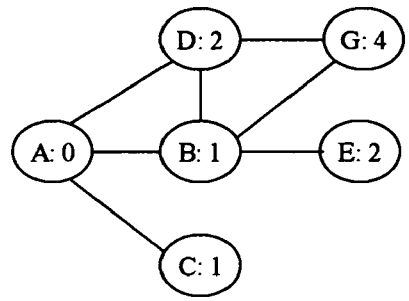
FIGURE 4(E)
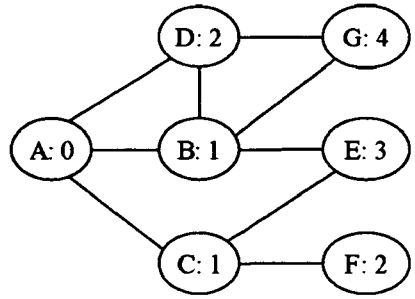
FIGURE 4(F)
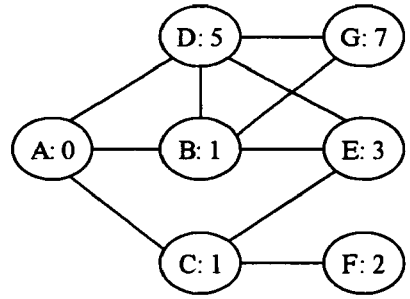
FIGURE 4(G)
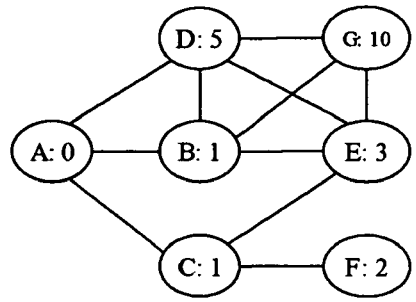
FIGURE 4(H)
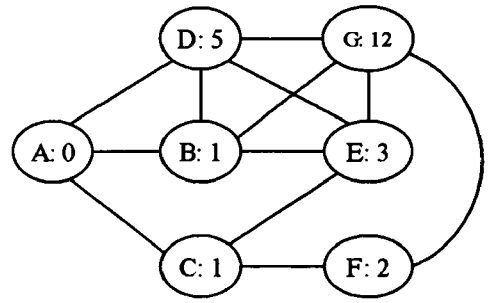
FIGURE 4(I)
Final sequence: A → B → C → F → E → D → G, or A → C → B → F → E → D → G.
FIGURE 4(J)

SYSTEM, METHOD AND PROGRAM TO ESTIMATE COST OF A PRODUCT AND/OR SERVICE

BACKGROUND OF THE INVENTION

The invention relates generally to automatic estimation of a cost of a product and/or service, and deals more particularly with automatic estimation of an overall cost of a product and/or service when there are multiple components to the overall cost, and the cost of some of the components are interdependent on each other.

Often times a product or service consists of multiple components, such as parts that make up the product and tasks and tools that make up the service. For example, in a web hosting service business, servers and desktop computers need to be purchased or leased. This is the hardware cost of the service. Along with the hardware, software needs to be purchased or leased in order to run a hosting application. This is the software cost of the service. Level 1 support staff and Level 2 server support staff need to be hired as well. This is the labor cost of the service. Some other services need to be applied on the server. This is a service cost. The total amount of the hardware, software, service, and labor costs are the total cost of the web hosting service. In such a case, it is common that the costs of certain components affect the cost of other components, and this affect is a cascade effect. Some times, the costs of components affect the costs of other components in a circular manner. In such a case, when the cost of one component changes, it will affect the cost of other components which in turn affect the cost of the one component. In the foregoing web hosting service example, the labor cost, the software cost and the service cost depend on the hardware cost. Also, the service cost may also depend on the labor cost. Consequently, in a dependency graph, there is a circle formed with one edge pointing from the labor cost to the hardware cost, another edge pointing from the service cost to the labor cost, and another edge from the service cost to the hardware cost. This cost dependency graph is shown in FIG. 7. When the number of servers changes, the hardware cost changes, and therefore, the labor cost, the software cost and the service cost will also change accordingly. But, when the labor cost changes, the service cost changes again.

It has proven difficult and inefficient in the past to calculate the overall cost of a product and/or service when the costs of some of its components are dependent on the costs of other of its components. For example, the existing algorithms may require that the service cost be calculated twice (i.e. in two iterations) when the hardware cost changes. Also, after the initial calculation of cost is made, certain costs may change over time, and this requires additional calculations.

A known IBM Solution Advisor Global Edition (SAGE) program is an iterative costing tool (and is implemented in Visual Basic program language). The SAGE program utilizes a representation of a directed acyclic graph (DAG) which illustrates the cost dependencies of different components of the product and/or service. A graph is a DAG if it contains no directed cycles. A DAG has at least one root node. FIG. 1 illustrates an example of a prior art DAG. Each linking indicates that the cost of one of the components is dependent on the cost of another of the components. The source of each arrow indicates the cost dependent component, and the destination of each arrow indicates the cost "driving" component. In this example, the costs of components B, C and D depend on the cost of component A. The costs of components D, E and G depend on the cost of component B. The costs of components E and F depend on the cost of component C. The cost of component G depends on the cost of component D. The costs of components D and G depend on the cost of component E. The cost of component G depends on the cost of component F. The cost of component A depends on no other components. The cost dependencies are represented in a dependency list which lists the pairs of interrelated components and which component cost of each pair depends on the other component cost in the pair. When a component's cost is changed (by a factor outside of the costs of the other components), it triggers the recalculation of the cost of this component and all other components whose cost is dependent on this component as illustrated in the DAG. Because of some circular nature of the cost dependencies, the recalculation could require multiple iterations of calculations as follows: When the cost A changes, the costs of D, B and C need to be recalculated. If the cost D is calculated first and the cost B is calculated second, then because the cost of D also depends on the cost of B, when the cost of B changes, the calculated cost of D needs to be updated according to the change in the cost of B. Therefore, it requires two iterations of changes for the cost of D. Then when the cost of E changes, the cost of D needs to be updated again. Therefore, the calculation of the cost of D requires three iterations.

A known Depth-first search process comprises traversing or searching a tree or a graph by starting at a root node and exploring as far as possible along each node before backtracking. This algorithm does not specify which node is selected first. Usually it selects the left most node first. When this algorithm is applied to the foregoing example, the order of the first set of nodes is A, D and G. The order of the second set of nodes is B, D, G, E, D, and G. After the second traversal, the costs of D and G are calculated more than once, with three iterations of calculation for the cost of D and two iterations of calculation for the cost of G.

A known Breadth-first search process comprises traversing or searching a tree or a graph starting at a root node and exploring all the neighboring nodes. Then for each of those nearest nodes, the algorithm explores their unexplored neighbor nodes, and so on until it finds the goal. When applying this algorithm to the foregoing example, the order of the first set of nodes is A, D, B, and C. The order of the second set of nodes is G. The order of the third set of nodes is D, G, and E. The order of the fourth set of nodes is E and F. After the fourth traversal, the costs of D, G, and E are required to be calculated twice.

Other known processes for calculating the cost of a product and/or service are described in U.S. Pat. No. 6,330,552 B1 and U.S. patent application Publication US 2001/0027447 A1.

While the foregoing processes are effective, improvements can be made in the efficiency of the cost estimation.

An object of the present invention is to effectively estimate the cost of a product and/or service comprised of multiple components whose costs are dependent on each other.

Another object of the present invention is to efficiently provide the foregoing cost estimation.

Another object of the present invention is to provide the foregoing cost estimation with a single iteration of cost estimation.

SUMMARY OF THE INVENTION

The invention resides in a system, method and computer program product for estimating the cost of a product and/or service. The product and/or service comprises a multiplicity of components. One or more first components with no cost dependencies are determined and assigned to a first tier. One or more second components whose costs depend on the costs of the one or more first components are determined and assigned to a second tier. One or more third components whose costs depend on the one or more second components are determined and assigned to a third tier. A determination is made if any of the one or more third components were assigned to said second tier, and if so, such one or more third components are removed from the second tier. One or more fourth components whose costs depend on the one or more third components are determined and assigned to a fourth tier. A determination is made if any of the one or more fourth components were assigned to the third tier, and if so, such one or more fourth components are removed from the third tier. A determination is made if one or more of the fourth components were assigned to said second tier, and if so, such one or more fourth components are removed from the second tier. An order to calculate costs of the components is based on the tier to which they are assigned, the lower the tier the earlier in the order.

The invention also resides in a system, method and computer program product for estimating the cost of a product and/or service. The product and/or service comprises a multiplicity of components. One or more first components with no cost dependencies are determined. One or more second components whose costs depend on the cost of the one or more first components are determined. One or more third components whose costs depend on the one or more second components are determined. One or more fourth components whose costs depend on the one or more third components are determined. For each of the second, third and fourth components, an initial weight based on and greater than a weight of the respective first, second or third component from which the cost of said second, third and fourth component depends is determined. For each of the third components which is one of the second components, the weight of the third component is increased based on the weight of the second component from which the cost of the third component depends. For each of the fourth components which is one of the third components, the weight of the fourth component is increased based on the weight of the third component from which the cost of the fourth component depends. A cost of each of the first, second, third and fourth components is determined in ascending order of their weights.

DETAILED DESCRIPTION OF THE PREFERRED EMBODIMENTS

Figure 2:
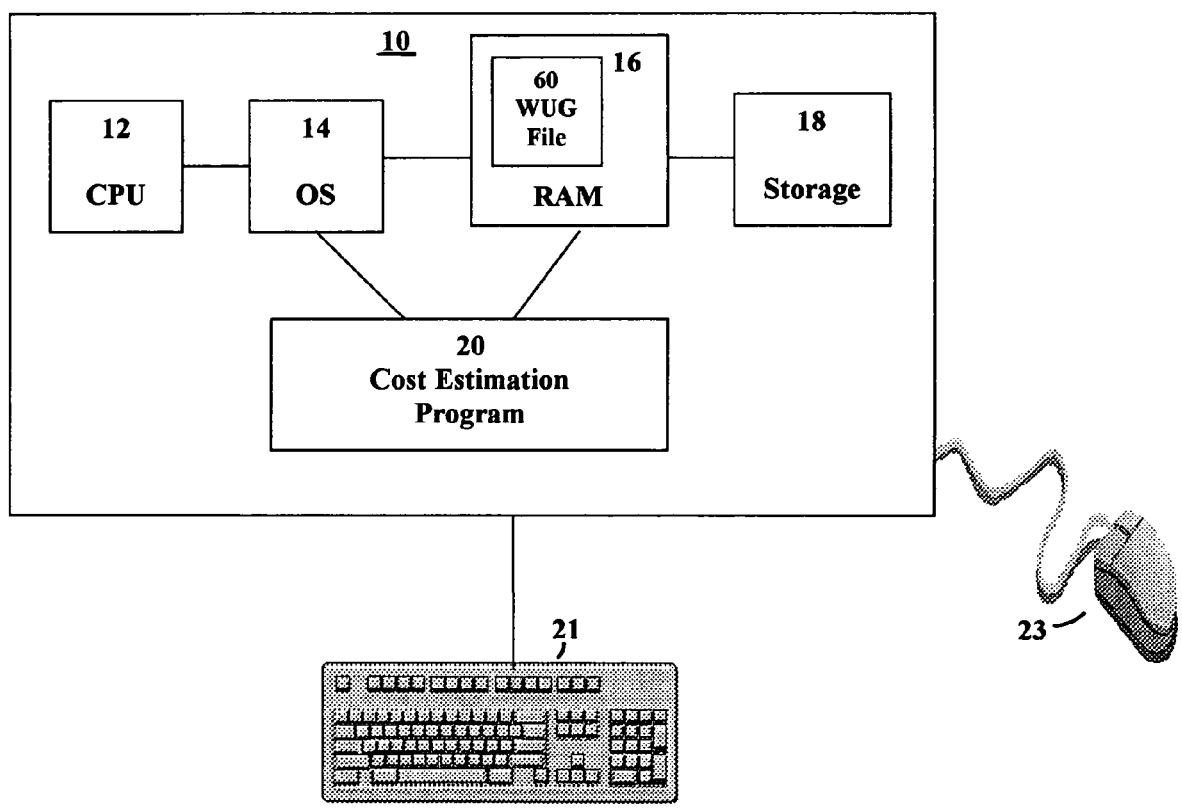
FIG. 2 is a block diagram illustrating a computer system in which the present invention is installed and executed.

The present invention will now be described in detail with reference to the figures. FIG. 2 illustrates a computer system generally designated 10 in which the present invention is installed and executed. System 10 comprises a known CPU 12, operating system 14, RAM 16 and storage 18. System 10 also includes a cost estimation program 20 according to one embodiment of the present invention to estimate the cost of a product and/or service comprised of a multiplicity of components. For the product, these components may be "parts". For example, a computer may comprise memory, mouse, keyboard, and other parts. For the service, these components may be tasks, associated tools, incidental materials, etc. For example, a web hosting type of service may comprise hardware maintenance, help desk support tasks, network diagnose tools, software, servers, workstations, etc.

Figure 1:
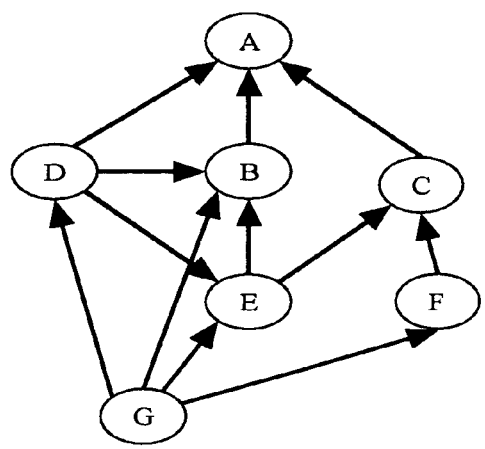
FIG. 1 is a diagram of a directed acyclic graph according to the Prior Art.

Through a user interface (keyboard 21 and/or mouse 23) for system 10, an operator identifies each component of the product and/or service, and their cost dependencies, if any, on the other components of the same product and/or service. The components and cost dependencies of the example of FIG. 1 have been described above. Typically, there are many more components of a subject product and/or service than illustrated in FIG. 1, even thousands of components. Then, cost estimation program 20 or another, known program generates a representation of a DAG or other data structure which includes these components and indicates their cost dependencies. In accordance with the present invention, cost estimation program 20 determines an order in which the cost of the components should be calculated. This order requires only one iteration to calculate the cost of the components and then the overall cost of the product and/or service, despite cost interdependencies of the components. To order the components for a cost estimation, cost estimation program 20 converts the DAG (or other such data structure) into a new type of data structure which can be called a weighted undirected graph ("WUG") for purposes of explanation. To convert the DAG into the WUG, program 20 first identifies one or more "driving" components, i.e. components with input cost data that has changed. The driving components can be included in a dependency list but their cost does not depend on the cost of any other component. In the foregoing web hosting service example, the driving component is the hardware. Then, program 20 writes the identities of the driving components into a WUG file 60. Figuratively, the driving component(s) can be represented by respective icon(s) in a first level/root vertex of a WUG tree. Then, program 20 identifies from the DAG those components whose cost directly depends on the first level component(s), and stores them in the WUG file, if not already resident in the WUG file. Figuratively, these cost dependent components are located in a second level of the WUG tree linked to/depending from the first level component. Then, program 20 identifies from the DAG the components whose cost depends on the second level component(s), and stores them in the WUG file, if not already resident in the WUG file. Figuratively, these components are located in a third level of the WUG tree linked to/depending from the second level component. The foregoing process is repeated for each other level in the DAG, until all the components in the DAG have been considered and written into the WUG file. When each driving component is first written to the WUG file, program 20 assigns a baseline weight such as "zero" (although any baseline reference level will work). When each cost dependent component is first written to the WUG file, program 20 assigns an initial weight to the component so that the initial weight of the component is larger than its parent, for example, the weight of its parent plus one unit. (The "parent" is the component in the lower level upon which the "child" in the higher level is dependent in part for its cost. For example, a driving component is a "parent", and its direct dependents are its "children".) Also, when each cost dependent component is subsequently identified and considered for addition to the WUG file, if the cost dependent component already resides in the WUG file, then it is not added again. Instead, the weight of the previously-listed cost dependent component is incremented by the weight of its parent (which already resides in the WUG). In addition, each child of this previously-listed cost dependent component is incremented by the weight of the same parent of this previously-listed cost dependent component. This ensures that all the children of the previously-listed cost dependent component/parent have a higher weight than their parent. Program 20 then determines an order to calculate the cost of each component based on their relative weights, the lower the weight, the earlier in the calculation order. (If there is more than one component with the same weight, their relative order of cost calculation does not matter.) The foregoing process can calculate the cost of each component in a single iteration. Then, program 20 calculates the new, overall cost of the product and/or service by summing the costs of the separate components.

Figure 3:
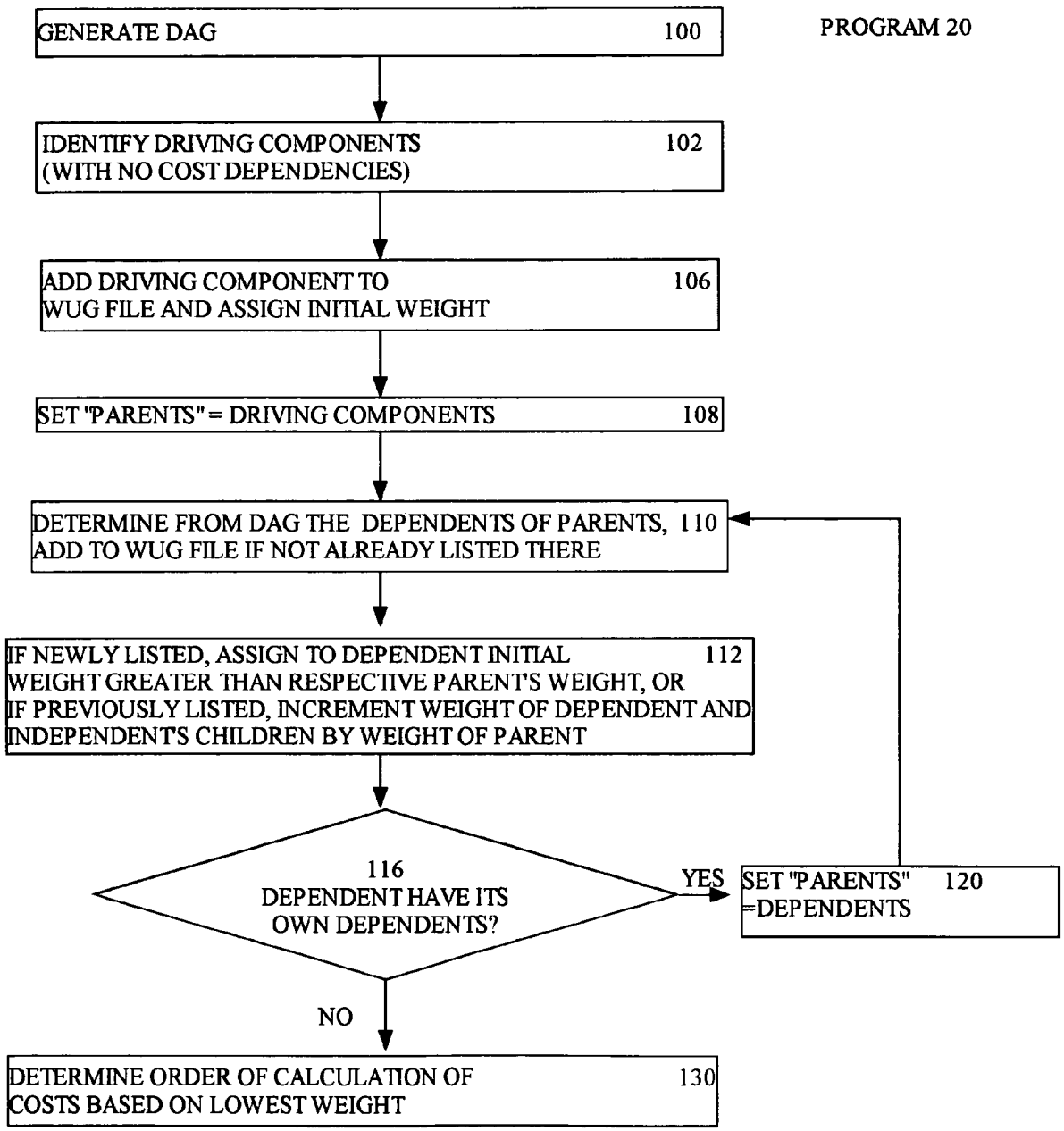
FIG. 3 is a flow chart illustrating a cost estimating program according to one embodiment of the present invention.
Figure 4A:
FIGS. 4(A-J) figuratively show intermediary and final results of processing by the cost estimating program of FIG. 3.
Figure 4B:
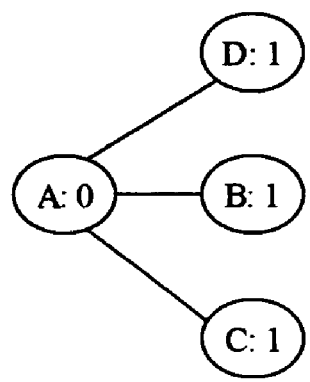

FIG. 3 is a flow chart illustrating the foregoing algorithm/function of program 20 in more detail. A function within program 20 or another known program generates a representation of a DAG or other data structure which lists the components of the product and/or service and their cost dependencies, if any, on other components within the same product and/or service (step 100). The DAG is represented in RAM 16 by a list of pairs of cost dependent components, and an indication of which component's cost in each pair is dependent on the cost of the other component in the pair. By way of example, the DAG is that illustrated in FIG. 1. Then, program 20 begins to construct the weighted undirected graph (WUG) by searching the representation of the DAG for the driving component(s), i.e. the component(s) with no cost dependencies in the DAG (step 102). Program 20 identifies the driving component(s) by searching the source components in the dependency list which do not depend on any other component. In the illustrated example, the driving component is labeled "A" in the DAG. Next, program 20 adds the identity of the driving component to the WUG file 60 and assigns a weight equal to the minimum/baseline value, such as "zero" (step 106). Figuratively, based on this minimal weight, the driving component A resides in a first level as illustrated in FIG. 4(A). However, in the preferred embodiment of the present invention, the WUG file 60 does not indicate levels (or cost dependencies) of components, just the identities of the components and their weights. Program 20 then sets a variable "Parents" equal to the identities of the driving component(s) (step 108). Next, program 20 identifies from the DAG the children of the Parents, i.e. the children of the first level, driving component(s), and adds them to the WUG file 60 if not already listed there (step 110). In the illustrated example, components B, C and D are the children of Parent A. Next, program 20 assigns an initial weight to each of these children, if not previously listed in the WUG file (step 112). In accordance with the present invention, the initial weight of these children is greater than the weight of their parent. In the illustrated embodiment, the initial weight of these children equals the parent's weight plus one unit. In the illustrated example, the initial weight of each child component B, C and D equals one unit because the weight of their parent component A equals zero. If any of the children (ex. B, C or D) of the parent (ex. A) were previously listed in the WUG file, then the children's (ex. B, C and D's) weight and their children's weight would be incremented by the weight of their parent (ex. A) (step 112). This will not be done in the illustrated example for children B, C or D because none of the children B, C or D was previously listed in the WUG file 60.

Figure 4C:
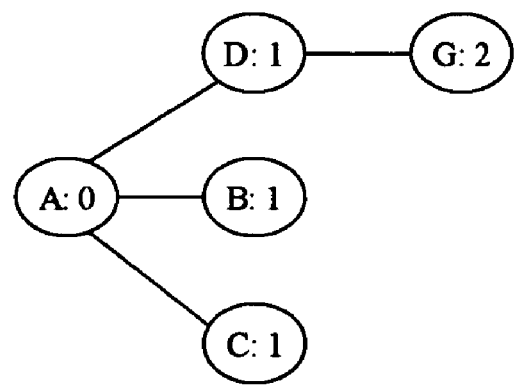

Next, program 20 determines from the DAG if any of the dependents/children (ex. B, C or D) of the Parent (ex. A) have dependents/children of their own (decision 116). In the illustrated example, this is the case. So, for each dependent/child (ex. B, C and D) of the Parent (ex. A), program 20 repeats steps 110, 112 and 116 by successively setting the "Parent" variable to each dependent/child (ex. B, C and D (step 120). Thus, for each such child (ex. B, C and D), program 20 identifies its children from the DAG and adds them to the WUG file 60 if not already identified there (step 110). Program 120 also assigns an initial weight to the child greater than their parent's weight if the component is not already listed in the WUG file 60 or increments the existing weight of the child and the child's children by the weight of the parent if the component is already listed in the WUG file (step 112). As illustrated in the DAG, component G is the child of D. FIG. 4(C) illustrates the addition to the WUG file 60 of the child G of parent D in step 110 (although the WUG file 60 does not indicate the dependencies or the levels of the components). The initial weight of child component G equals two units because the weight of the parent D is one unit. Because component G was not previously listed in WUG file 60, there are no additions to the weight of component G or other children of component G due to this new listing of component G in the WUG file 60. As illustrated in the DAG, components D, G and E are the children of B. FIG. 4(D) illustrates the addition to the WUG file 60 of the child D of parent B in step 110 (although the WUG file 60 does not indicate the dependencies or the levels of the components). Component D already exists in the WUG file 60, so program 20 does not list the identity of component D again in WUG file 60. Instead, as illustrated in FIG. 4(D), program 20 increments the weight of component D by the weight of its parent B and also increments the weight of child G of parent D by the weight of component B. Because the weight of component B is one unit, program 20 increments the weight of component D by one unit to two units and increments the weight of component G by one unit to three units. (This ensures that the child D has a higher weight than its parent B and that the cost of child D will ultimately be calculated after the cost of parent B.) FIG. 4(E) illustrates the addition to the WUG file 60 of the children G and E of parent B in step 110 (although the WUG file 60 does not indicate the dependencies or the levels of the components). Component G already exists in the WUG file 60, so program 20 does not list the identity of component G again in WUG file 60. Instead, program 20 increments the weight of component G by the weight of parent B. So, in the illustrated example, program 20 increments the weight of component G by one unit to four units. Component G has no children yet, so there are no children of component G to have their weight incremented by the weight of parent B. Component E was not previously listed in WUG file 60, so program 20 lists the identity of component E in WUG file 60. Program 20 assigns an initial weight of child E to two units because the weight of the parent B is one unit (and the initial weight equals the weight of the parent component plus one unit). FIG. 4(F) illustrates the addition to the WUG file 60 of the children of component C. As illustrated in the DAG, components E and F are the children of component C. Component E already exists in the WUG file, so program 20 does not list it again. Instead, program 20 increments the weight of component E by the weight of parent component C. In the illustrated example, the weight of parent component C is one unit, so program 20 increments the weight of component E by one unit to three units as illustrated in FIG. 4(F). Component E has no children yet, so there are no children of component E to have their weight incremented by the weight of parent C. Component F was not previously listed in WUG file 60, so program 60 adds the identity of component F to the WUG file 60. Program 60 assigns an initial weight to component F of two units because the initial weight of the parent C is one unit.

Next, for each third level component E, F and G (decision 116, yes branch and step 120), program 20 identifies its children from the DAG, and adds them to the WUG file 60 if not already listed there (step 110). Then, program 20 assigns an initial weight (parent's weight+one unit) or increments the existing weight of the child and the child's children as indicated above (step 112). As illustrated in the DAG, the children of E are components D and G. FIG. 4(G) illustrates the addition to the WUG file 60 of the child D of parent E in step 110. Component D already exists in the WUG file 60, so the weight of D is incremented by the weight of parent E (step 112). So, in the illustrated example, the weight of D is incremented by three units to five units. Also, the weight of the sole child of parent D is incremented by the weight of component E to seven units. (This ensures that the child G has a higher weight than its parent D and that the cost of child G will ultimately be calculated after the cost of parent D.) FIG. 4(H) illustrates the addition to the WUG file 60 of the child G of parent E in step I 10. Component G already exists in the WUG file, so the weight of child G is incremented by the weight of parent E. So, in the illustrated example, the weight of G is incremented by three units to ten units. Component G has no children, so there are no children of component G to increment by the weight of component E. FIG. 4(I) illustrates the addition to the WUG file of the sole child G of component F in step 110. Component G already exists in the WUG file, so the weight of component G is incremented by the weight of parent F. So, in the illustrated embodiment, the weight of component G is incremented by two units to twelve units. Component G has no children, so there are no children of component G to increment by the weight of component F. Next, program 20 searches the DAG and determines that component G has no children (decision 116, no branch).

Next, program 20 determines the order of calculating the costs based on the weights, the lower the weight, the earlier the order of calculating the costs of the respective components (step 130). In the illustrated example, FIG. 4(J) illustrates the order of calculating the cost of each component, where the number in parenthesis indicates the weight determined from the WUG. In this example, the order is A, B, C, F, E, D and G or A, C, B, F, E, D and G. (Because components B and C have the same weight, their costs can be calculated in either order.) Thus, program 20 will first determine the cost of component A, then the cost of component B (or the cost of component C), then the cost of component C (or the cost of component B), then the cost of component F, then the cost of component E, then the cost of component D and finally the cost of component G. In accordance with the present invention, the determination of the cost of each component is made just once. After the cost of each component is calculated, program 20 determines the overall cost of the product and/or service by adding the costs of all the components.

Figure 5:
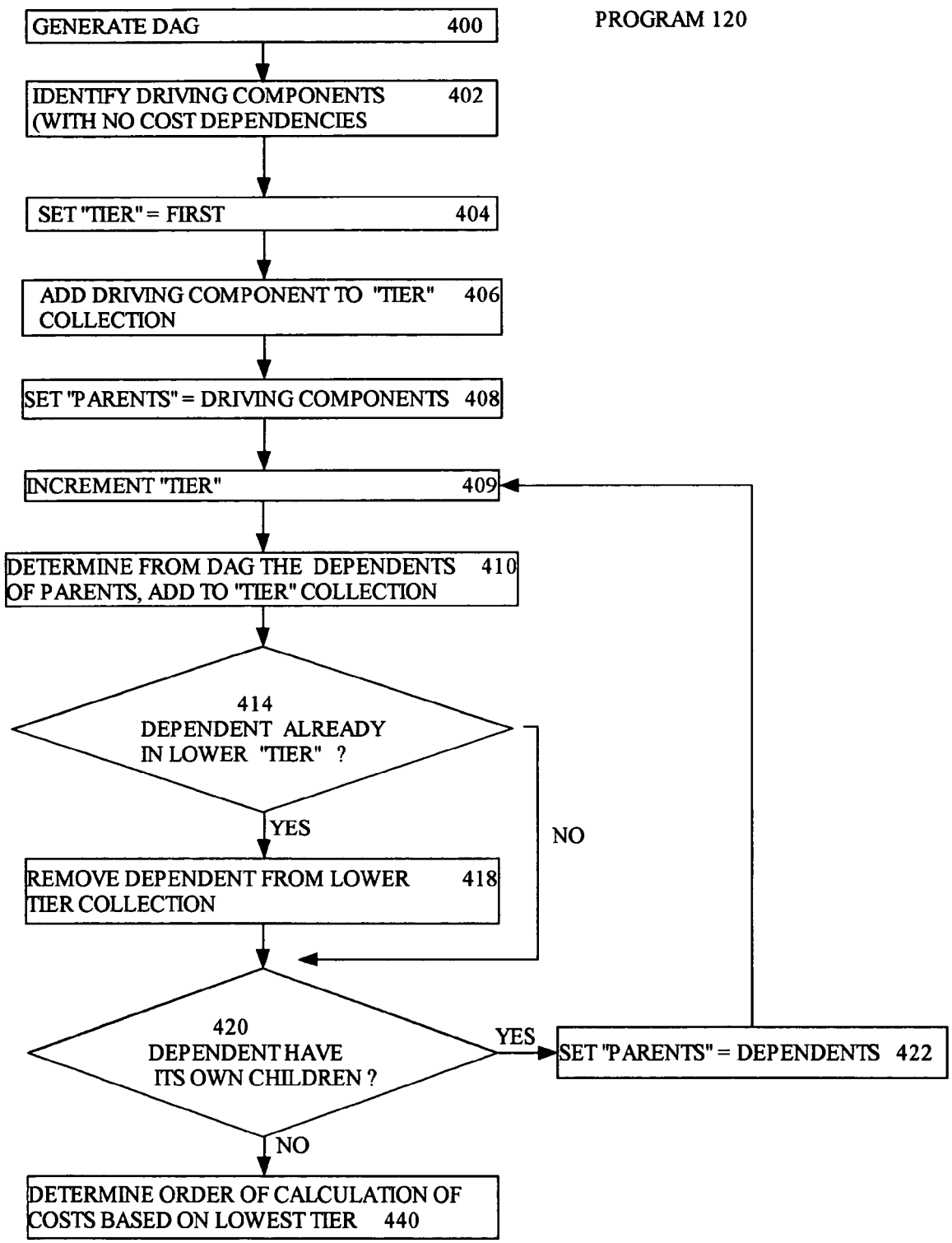
FIG. 5 is a flow chart illustrating a cost estimating program according to another embodiment of the present invention.
Figure 6A:
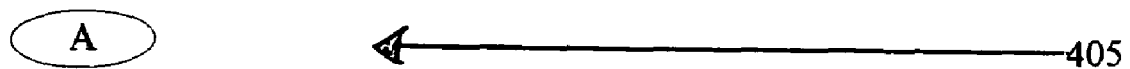
FIGS. 6(A-H) figuratively show intermediary and final results of processing by the cost estimating program of FIG. 5.

The following describes another embodiment of the present invention, i.e. program 120, implemented in Visual Basic programming language, although other programming languages can be used as well. Program 120 can be installed and executed in computer 10 instead of program 20. The algorithm of program 120 is implemented in a tiered structure using a dictionary object in the Visual Basic programming language as a collection holder. Each "collection" contains the component identities assigned to the same tier. As explained below, program 120 will generate multiple tiers representing the order of calculating the costs of the components, with the costs of the components in the lowest tier being calculated first. The steps of program 120 are as follows. In step 400 of FIG. 5, program 120 or another known program generates the DAG. Database 50 represents the DAG as listings of pairs of related components, and the "direction" of the relationship, i.e. which component of each pair is dependent on the other component of the pair. The DAG can also be represented in the computer memory as a data structure to hold the listings of pairs of related components. Then, program 120 constructs a first or lowest tier/collection by querying the database 50, such that the components are listed in the source column of the components, but not listed in the dependent column of the database. The business requires that there is no circular reference, i.e. no circle in the DAG with directions such that one component will eventually point back to itself. Thus, there is at least one component that does not depend on any other component. Program 120 then puts these root driving component(s), i.e. component(s) with no cost dependencies in the first tier of collection. In the simplest web hosting business example, the Hardware component is the root driving component. In the example illustrated in FIG. 1, the driving component is component A in the DAG. Then, program 120 sets a variable "Tier" equal to "first" (step 404). Then, program 120 stores the identity of component A in the first tier collection. The collection is hold in a collection queue 160 in the computer memory (step 406). The result is figuratively shown as first tier/collection 405 in FIG. 6(A).

Figure 6B:
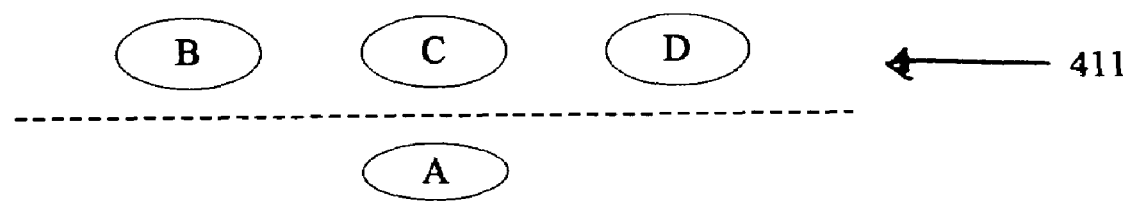

Then, program 120 sets a variable "Parent(s)" equal to the driving component(s) (step 408), and increments the variable "Tier" to "Second". Then, program 120 identifies from the database 50 which components depend on the Parent/driving component (ex. A) and stores them in a second tier/collection of the collection queue 160 (step 410). In the illustrated example, the costs of components B, C and D depend on the cost of component A, so the identities of components B, C and D form the second tier/collection. The second tier collection then added to the collection queue 160. The result is figuratively shown as second tier/collection 411 in FIG. 6(B). In accordance with the present invention, the higher the tier in which a component resides the more levels of dependency is its cost, so the later its cost is calculated in the sequence. Next, program 120 determines if any of components B, C or D currently resides in a lower tier/collection (decision 414). In the illustrated example, none of the components B, C or D currently resides in the first tier/collection, so program 120 does not remove any components from the first tier/collection. (If any of the components B, C or D resided in the first tier/collection (decision 414, yes branch), then program 120 would have removed them from the first tier/collection (step 418)).

Figure 6C:
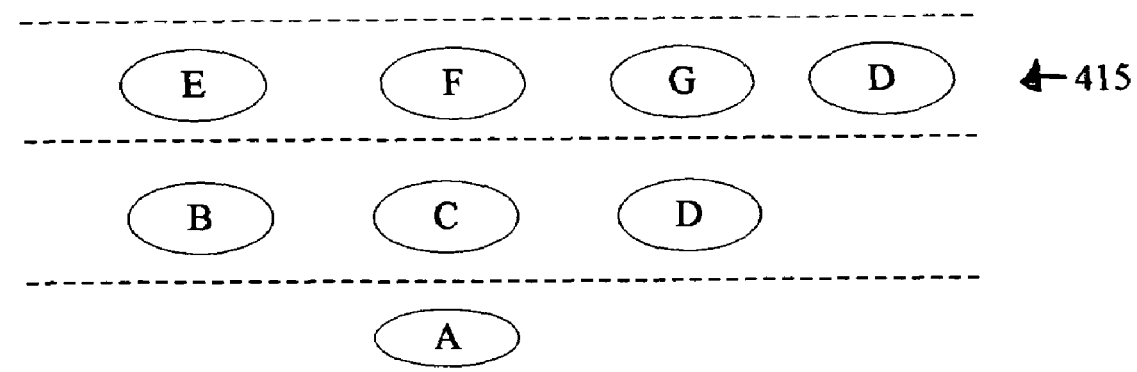
Figure 6D:
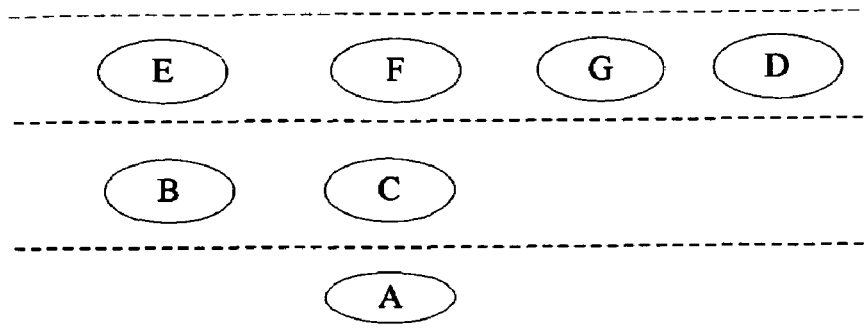

After decision 414, program 120 determines from the DAG if any of the dependents (ex. B, C or D) of the first tier component (ex. A) have children (decision 420). If so, program 120 sets the variable "Parents" equal to the second tier components (ex. B, C and D) (step 422). Then, program 120 loops back to step 409 to repeat the foregoing steps 409, 410, 414, 418 and 420. Thus, program 120 increments the variable "Tier" to "Third" (step 409). Then, program 120 identifies from the database 50 the components whose costs depend on the components in the second tier/collection 411, to form a third tier/collection 415 in the collection queue 160 (step 410). In the illustrated example, the costs of components D, E and G depend on the cost of component B, the costs of components E and F depend on the cost of component C, and the cost of component G depends on the cost of component D. So, program 120 stores components D, E, F and G in the third tier/collection 415 in the collection object queue 160 in step 410). The result is figuratively shown in FIG. 6(C). Next, program 120 determines from the collection object queue 160 if any of components D, E, F or G currently resides in the first tier collection or the second tier collection (decision 414). In the illustrated example, component D currently resides in the second tier/collection, so program 120 removes component D from the second tier/collection (step 418). The result is figuratively shown in FIG. 6(D). In accordance with the present invention, the cost of component D will be calculated after the cost of components B and C, because the cost of component D has more levels of dependency than the costs of components B or C.

Figure 6E:
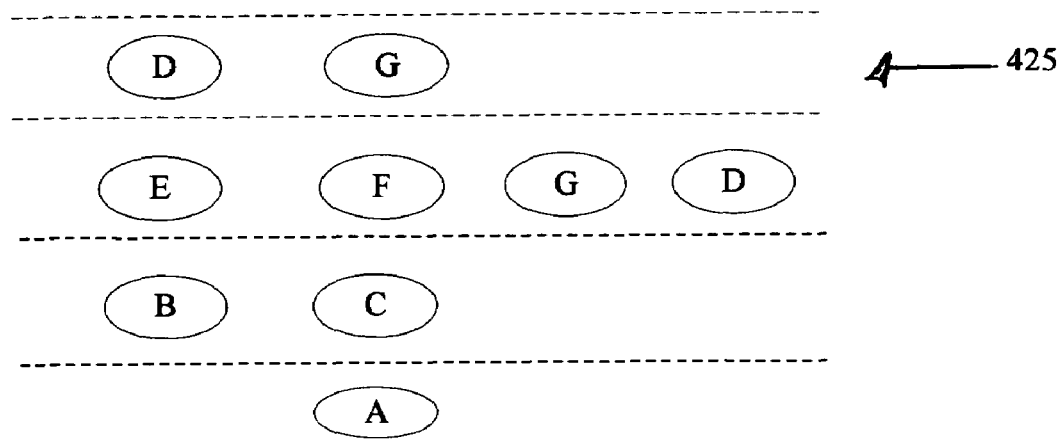
Figure 6F:
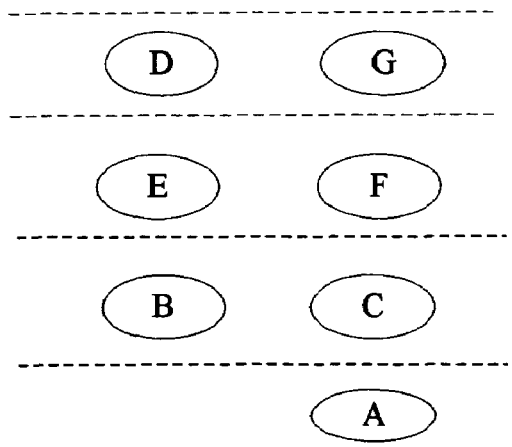

Then, program 120 determines if any of the third tier components have children (decision 420). If so, program 120 sets the variable "Parents" equal to the third tier components (step 422) and increments the "Tier" variable to "Fourth". Then, program 120 identifies from the database 50 the components whose costs depend on the components in the third tier/collection 415, to form a fourth tier/collection 425 in a collection object queue 160 (step 410). In the illustrated example, the costs of components D and G depend on the cost of component E, the cost of component G depends on the cost of component F, and the cost of no component depends on the cost of component G. So, program 120 stores components D and G in the fourth tier/collection 425 in database 60 in step 410. The result is figuratively shown in FIG. 6(E). Next, program 120 determines from collection object queue 160 if any of components D or G currently resides in first tier/collection, second tier/collection or third tier/collection (decision 414). In the illustrated example, components D and G currently reside in the third tier/collection, so program 120 removes components D and G from the third tier/collection (step 418). The result is figuratively shown in FIG. 6(F). In accordance with the present invention, the cost of components D and G will be calculated after the cost of components E and F, because the costs of component D and G have more levels of dependency than the costs of components E or F.

Figure 6G:
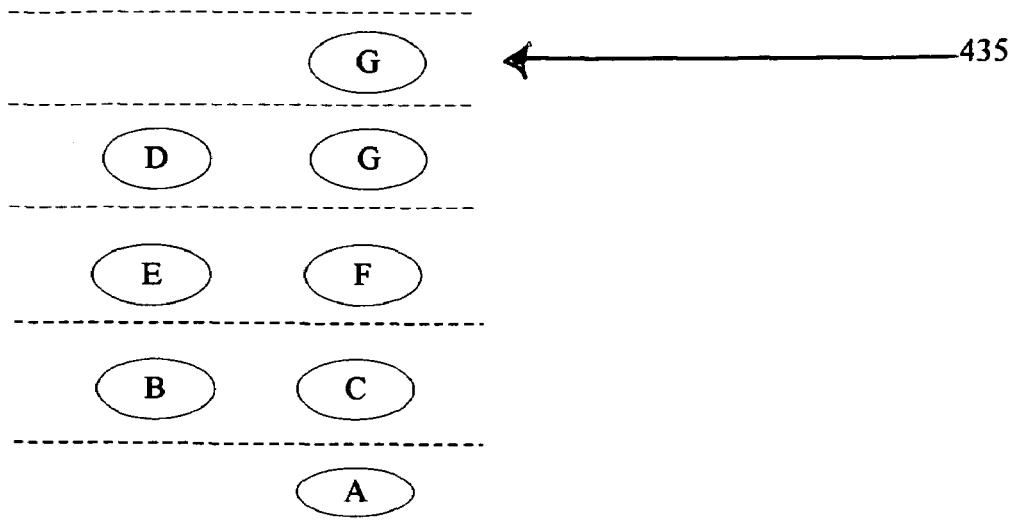
Figure 6H:
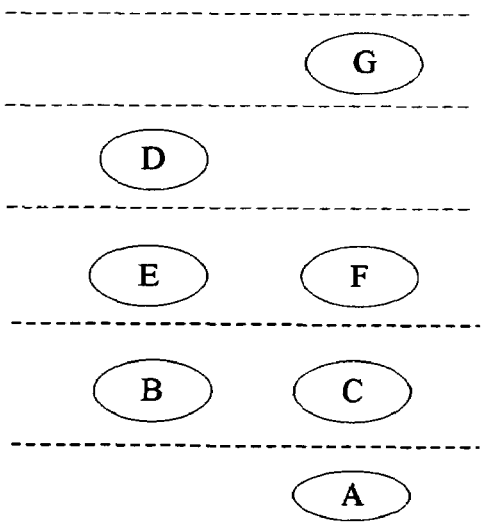
Figure 7:
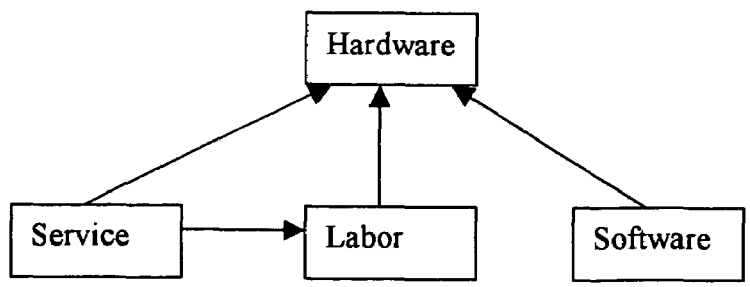
FIG. 7 is a diagram of a Prior Art cost dependency graph of a web hosting service example.

Then, program 120 determines if any of the fourth tier components have children (decision 420). If so, program 120 sets the variable "Parents" equal to the fourth tier components (step 422) and increments the "Tier" variable to "Fifth". Then, program 120 identifies from the database 50 the components whose costs depend on the components in the fourth tier/collection 425, to form a fifth tier/collection 435 in collection object queue 160 (step 410). In the illustrated example, the cost of component G depends on the cost of component D, and the cost of no component depends on the cost of component G. So, program 120 stores component G in the fifth tier/collection 435 in collection object queue 160. The result is figuratively shown in FIG. 6(G). Next, program 120 determines from the collection object queue 160 if component G currently resides in the first tier/collection, second tier/collection, third tier/collection or fourth tier/collection (decision 414). In the illustrated example, component G currently resides in the fourth tier/collection 425, so program 120 removes component G from the fourth tier/collection (step 418). The result is figuratively shown in FIG. 6(H).

The foregoing identification process is repeated as needed to form each higher tier/collection in the DAG. In the illustrated example, there are no higher tiers/collections.

Next, program 120 determines the order of calculating the costs of the components as follows. Program 120 reads the components in the first tier/collection, and designates their costs as the first group to be calculated (step 440). In the illustrated example, program 120 calculates the cost of component A first. If there were more than one component in first tier/collection, program 120 calculates the cost of the components in the first tier/collection in any order. The order of cost calculation of multiple components within the same tier/collection is not material, because the cost of no component within the same tier/collection depends on any other component in the same tier. Then, program 120 reads the components in the second tier/collection, and designates their costs as the second group to be calculated (step 440). In the illustrated example, program 120 calculates the cost of components B and C second. The order of cost calculation of multiple components within the same tier/collection is not material, because the cost of no component within the same tier/collection depends on any other component in the same tier. Then, program 120 reads the components in the third tier/collection, and designates their costs as the third group to be calculated (step 440). In the illustrated example, program 120 calculates the cost of components E and F third. The order of cost calculation of components E and F is not material, because the cost of components E and F do not depend on each other. Then, program 120 reads the components in the fourth tier/collection, and designates their costs as the fourth group to be calculated (step 440). In the illustrated example, program 120 calculates the cost of component D fourth. If there were more than one component in fourth tier/collection, program 120 calculates the cost of the components in the fourth tier/collection in any order. The order of cost calculation of multiple components within the same tier/collection is not material, because the cost of no component within the same tier/collection depends on any other component in the same tier. Then, program 120 reads the components in the fifth tier/collection, and designates their costs as the fifth group to be calculated (step 440). In the illustrated example, program 120 calculates the cost of component G fifth. If there were more than one component in the fifth highest, first tier/collection, program 120 calculates the cost of the components in the fifth tier/collection in any order. The order of cost calculation of multiple components within the same tier/collection is not material, because the cost of no component within the same tier/collection depends on any other component in the same tier. If there were additional higher tiers/collections, then the foregoing process would be repeated for each additional higher tier/collection. However in the illustrated example, there are no additional higher tiers/collections, so program 120 proceeds to sum the foregoing costs of the separate components to determine the total cost of all the components.

Based on the foregoing, a system, method and program for estimating the cost of a product and/or service comprised of a multiplicity of components, have been disclosed. However, numerous modifications and substitutions can be made without deviating from the scope of the present invention. For example, the collection object queue 160 can be implemented in a database. Therefore, the present invention has been disclosed by way of illustration and not limitation, and reference should be made to the following claims to determine the scope of the present invention.

The invention claimed is:

1. A system for estimating a cost of a product and/or service, said product and/or service comprising a multiplicity of components, said system comprising:

a user interface for receiving an identification of components of the product and/or service and cost dependency information of each of the components on other components of a same product and/or service;

generating means for generating a representation of a directed acyclic graph which includes the received identified components and the cost dependency information of each of the components on other components of the same product and/or service; and converting means for converting the representation of the directed acyclic graph to a representation of a weighted undirected graph for use in estimating the cost of the product and/or service, the converting means comprising:

identifying means for identifying one or more first components with no cost dependencies, and assigning said one or more first components to an nth priority in order of cost calculation, where "n" is an integer;

first determining means for determining one or more second components whose costs depend on the costs of said one or more first components, and assigning said one or more second components to an n+1 priority in order of cost calculation;

second determining means for determining one or more third components whose costs depend on said one or more second components, and assigning said one or more third components to an n+2 priority in order of cost calculation;

third determining means for determining if any of said one or more third components were previously assigned to said n+1 priority, and responsive to determining that any of said one or more third components were previously assigned to said n+1 priority, removing any of said one or more third components from said n+1 priority assignment; and fourth determining means for determining an order to calculate costs of said components based on the cost calculation priority to which said components are assigned, wherein the lower the priority of said component, the earlier in said order.

\* \* \* \* \*